(12) United States Patent
Kim

(10) Patent No.: US 6,259,897 B1
(45) Date of Patent: Jul. 10, 2001

(54) PAGING ANTENNA AND RADIOTELEPHONES INCORPORATING SAME

(75) Inventor: Seung Kil Kim, Chapel Hill, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/305,956

(22) Filed: May 6, 1999

(51) Int. Cl.$^7$ ........................................ H04B 1/38
(52) U.S. Cl. .................. 455/90; 455/129; 455/272; 343/702
(58) Field of Search .................. 455/90, 575, 550, 455/129, 272, 274, 351, 347, 349; 379/433.13, 433.01; 343/702, 860, 879, 882, 893

(56) References Cited
U.S. PATENT DOCUMENTS 5,907,306 * 5/1999 Karabinis et al. .................. 343/702
6,025,816 * 2/2000 Dent et al. .................. 343/702

* cited by examiner

*Primary Examiner*—Nguyen T. Vo
(74) *Attorney, Agent, or Firm*—Myers Bigel Sibley & Sajovec

(57) ABSTRACT

Antenna systems for electronic devices, such as radiotelephones, include a paging antenna that enhances paging mode operation when a pivotable primary antenna is in a stored position. Paging antennas are disposed within a hinge rotatably secured to one end of a radiotelephone housing. A primary antenna, in electrical communication with the transceiver, is secured to the hinge and rotatable therewith along a predetermined path of rotation from a stored position adjacent the housing to an operating position extending away from the housing. Radiation axes for a primary antenna and a paging antenna are orthogonal.

11 Claims, 6 Drawing Sheets

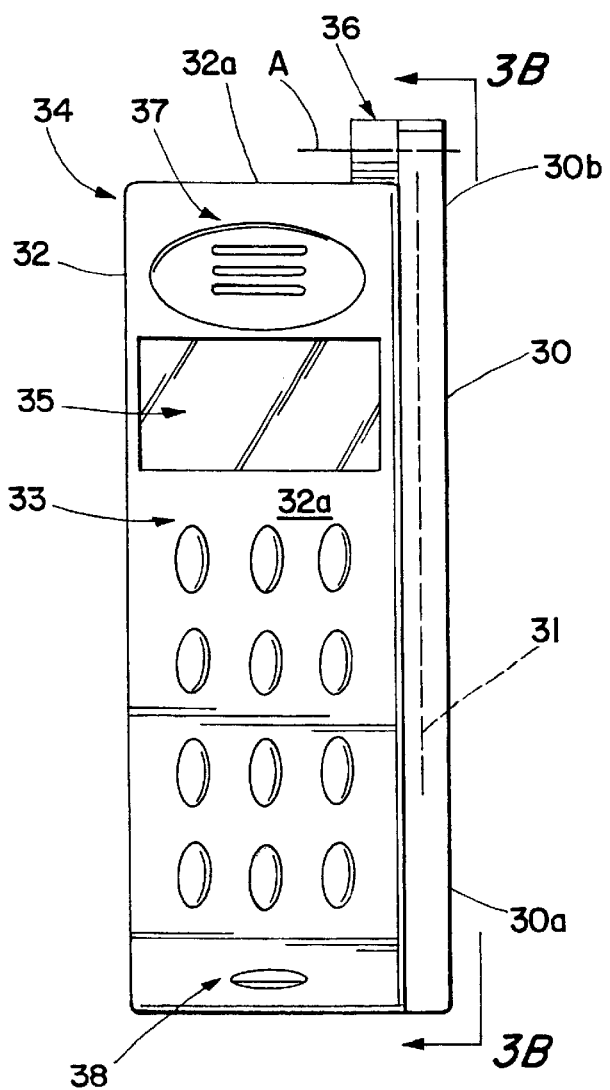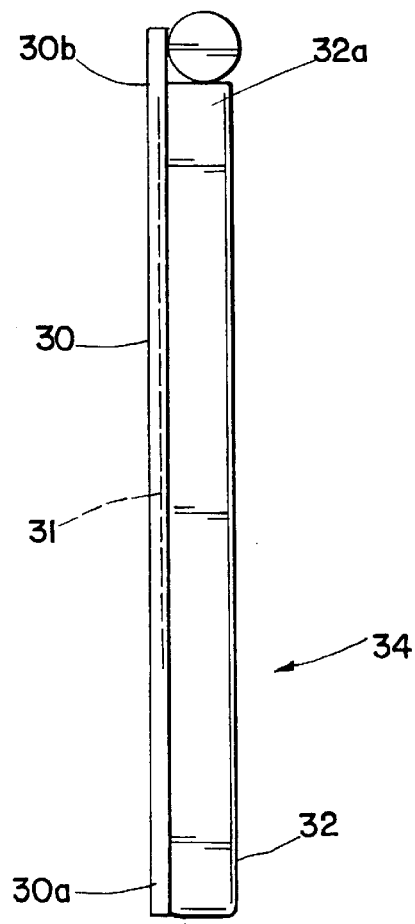
Fig. 3A
(PRIOR ART)
Fig. 3B
(PRIOR ART)

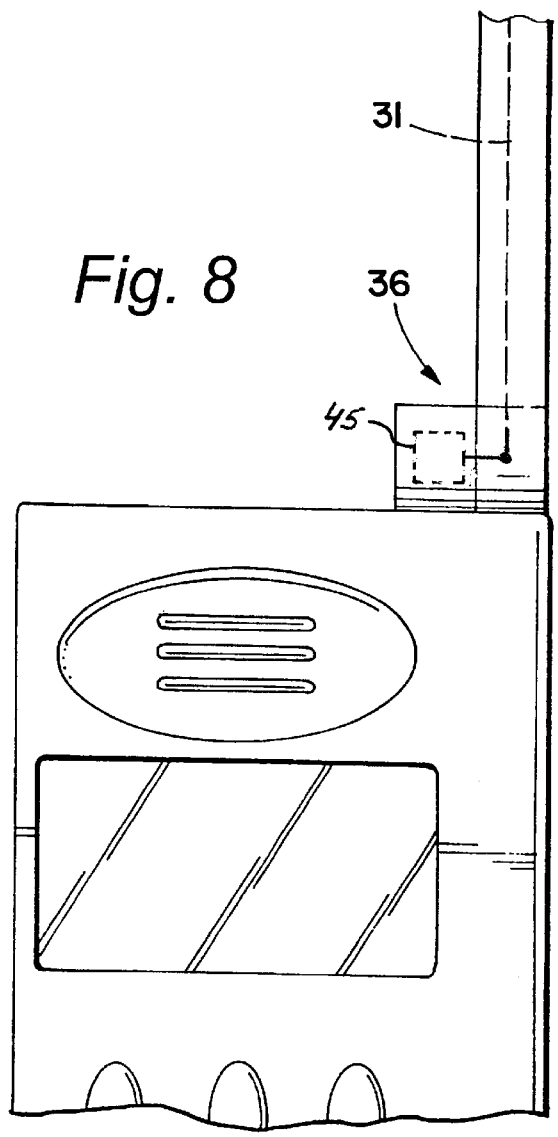
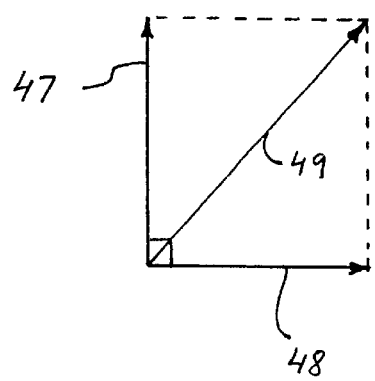

US 6,259,897 B1

PAGING ANTENNA AND RADIOTELEPHONES INCORPORATING SAME

FIELD OF THE INVENTION

The present invention relates generally to radiotelephones and, more particularly, to radiotelephone antennas.

BACKGROUND OF THE INVENTION

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems.

Radiotelephones and other communication devices are undergoing miniaturization. Indeed, many of the contemporary radiotelephone models are less than 11–12 centimeters in length. As a result, primary antennas that swivel or pivot from a stored position overlying the keypad or other housing portion of a radiotelephone to a position extending outwardly from the radiotelephone are becoming increasingly attractive to radiotelephone manufacturers. Pivotable primary antennas can achieve good radiation performance when in outwardly extended positions. Unfortunately, these pivotable antennas can be blocked by the body of a user when in a stored position (also known as "body shadowing"). As a result, radiotelephone operation may be difficult when a pivotable antenna is in a stored position.

In addition, when in a stored position, pivotable primary antennas that overlie a keypad or other housing portion of a radiotelephone may be insufficient for paging mode operation. For example, when a radiotelephone with a pivotable primary antenna in a stored position is placed within a user's shirt pocket, with the pivotable primary antenna facing the user's body (body shadowing problem), signal reception and radiation may be blocked by the user's body on one side and portions of the radiotelephone housing on the other side, particularly conductive housing portions.

It would be desirable to enhance the ability of radiotelephones that utilize pivotable primary antennas that overlie a keypad or other housing portion to receive paging signals when the primary antenna is in a stored position.

SUMMARY OF THE INVENTION

In view of the above, it is therefore an object of the present invention to enhance the ability of radiotelephones utilizing pivotable primary antennas to receive paging signals when a primary antenna is in a stored position.

It is another object of the present invention to facilitate miniaturization efforts with respect to radiotelephones and other communication devices.

These and other objects of the present invention are provided by antenna systems for electronic devices, such as radiotelephones, wherein a paging antenna is provided to enhance paging mode operation when a pivotable primary antenna is in a stored position. Radiotelephones incorporating a pivotable primary antenna typically utilize a hinge rotatably secured to one end of the radiotelephone housing. A primary antenna having a first radiation axis (i.e., signal vector) is secured to the hinge and rotatable therewith along a predetermined path of rotation from a stored position adjacent the housing to an operating position extending away from the housing.

A paging antenna according to the present invention is disposed within the hinge and is electrically connected with the primary antenna. The paging antenna has a second radiation axis (i.e., signal vector) that is orthogonal to the first radiation axis of the primary antenna and is configured to receive paging signals when the primary antenna is in a stored position.

Because paging antennas according to the present invention are located in a position unobstructed by other portions of a radiotelephone housing, a paging signal can be received even when the primary antenna is in a stored position. Paging antennas according to the present invention preferably have a coiled (e.g., helical or conical) configuration that comprises a radiation axis that is orthogonal to the radiation axis of the primary antenna. The paging antenna may operate as a quarter-wave antenna, such that the primary antenna and paging antennas operate independently as quarter-wave antennas in the operating and stored positions. Because the radiation axes of the primary and paging antennas are orthogonal, the vector sum of the primary and paging antenna signal vectors is the input signal to the transceiver. In addition, paging antennas according to the present invention are preferably configured such that an impedance of the primary antenna and paging antenna, in combination, matches an impedance of the transceiver when the primary antenna is in both the stored and operating positions.

Radiotelephones incorporating paging antennas according to the present invention can be advantageous because paging signals can be received even when a primary antenna is in a stored position and a radiotelephone is stored within a user's pocket. As a result, performance of radiotelephones, particularly paging performance, may be enhanced by the present invention. Furthermore, a paging antenna according to the present invention can combine with a primary antenna for better signal reception when the primary antenna is in both a stored and operating position.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3A illustrates the pivotable primary antenna of FIGS. 2A–2B in a stored position adjacent a portion of the radiotelephone housing.

FIG. 3B is a side elevational view of the radiotelephone of FIG. 3A taken along lines 3B—3B.

FIG. 7C illustrates an input signal to a transceiver which is the vector sum of a primary antenna signal and a paging antenna signal according to the present invention.

FIG. 8 illustrates impedance matching circuitry disposed within a hinge of a pivotable antenna for a radiotelephone according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
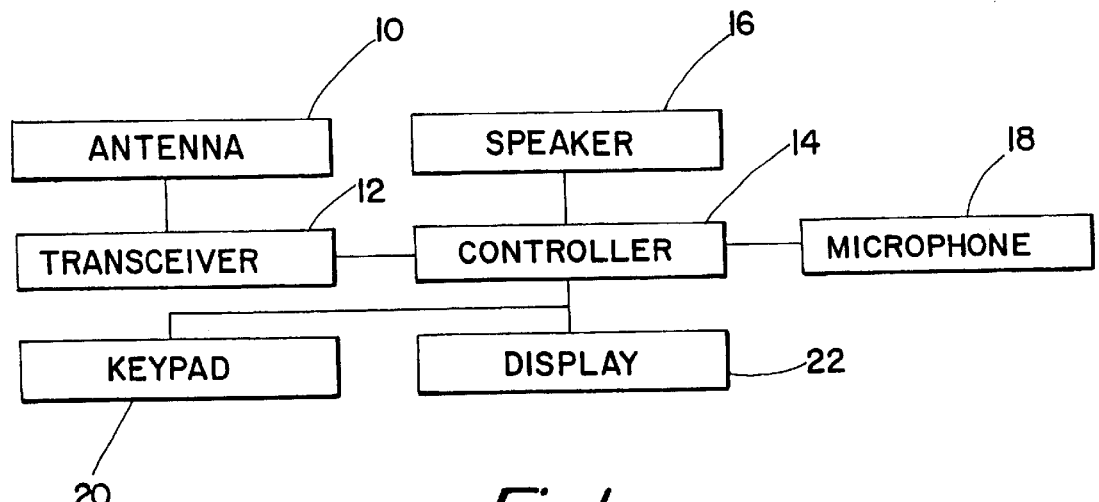
FIG. 1 is a schematic illustration of a conventional arrangement of electronic components for enabling a radiotelephone to transmit and receive telecommunications signals.

A conventional arrangement of electronic components that enable a radiotelephone to transmit and receive radiotelephone communication signals is shown schematically in FIG. 1, and is understood by those skilled in the art of radiotelephone communications. An antenna 10 for receiving and transmitting radiotelephone communication signals is electrically connected to a radio-frequency transceiver 12 that is further electrically connected to a controller 14, such as a microprocessor. The controller 14 is electrically connected to a speaker 16 that transmits a remote signal from the controller 14 to a user of a radiotelephone. The controller 14 is also electrically connected to a microphone 18 that receives a voice signal from a user and transmits the voice signal through the controller 14 and transceiver 12 to a remote device. The controller 14 is electrically connected to a keypad 20 and display 22 that facilitate radiotelephone operation. Other elements of radiotelephones are conventional and need not be described herein.

Conventional radiotelephones employ an antenna which is electrically connected to a transceiver operably associated with a signal processing circuit positioned on an internally disposed printed circuit board. To radiate radio frequency (RF) energy with minimum loss, or to pass along received RF energy to a radiotelephone receiver with minimum loss, the transceiver and the antenna are preferably interconnected such that their respective impedances are "matched". Impedance matching and systems for matching impedance are well known in this art and need not be discussed further.

Figures 2A, 2B:
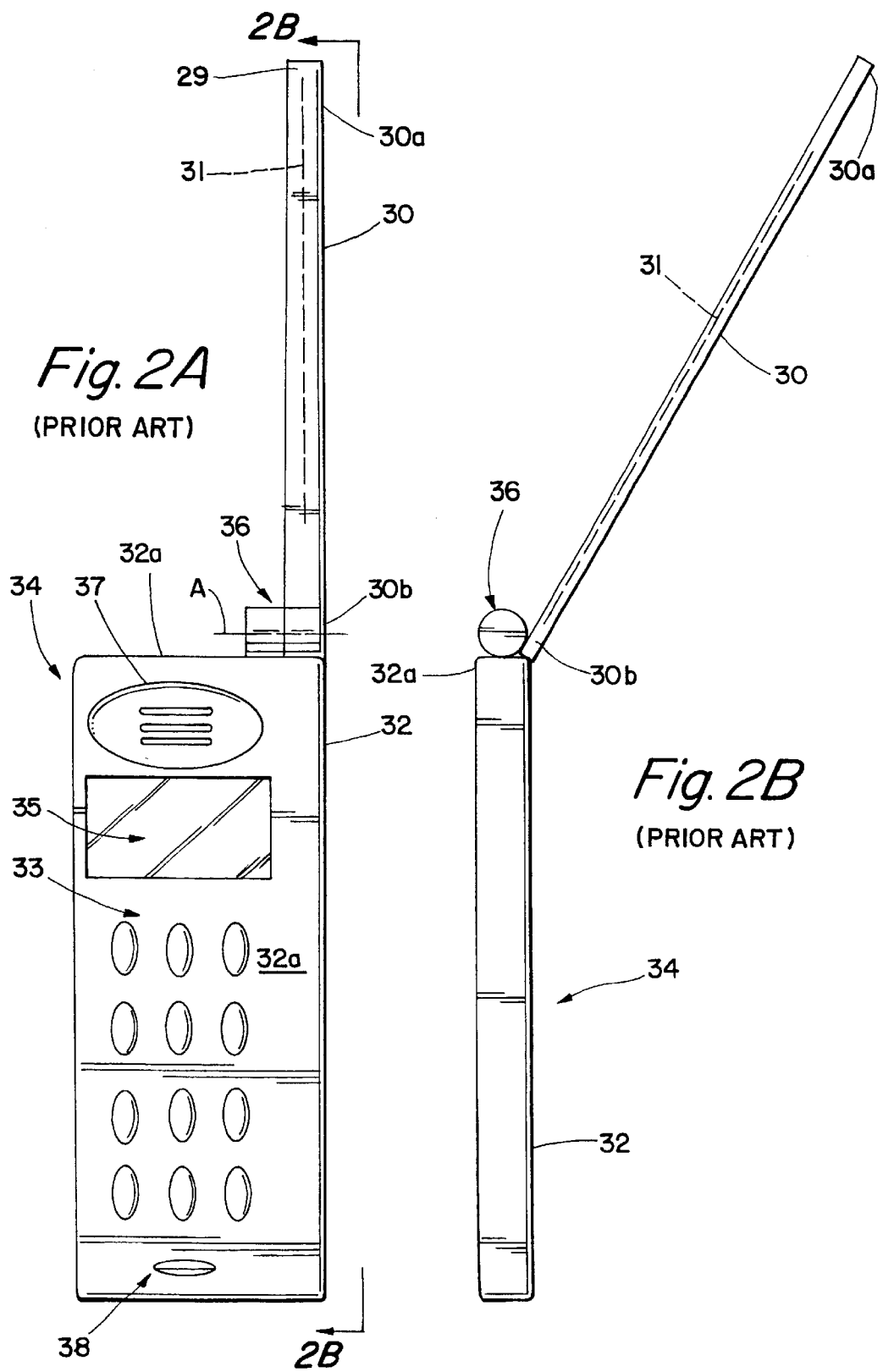
FIG. 2A illustrates an exemplary radiotelephone within which the present invention can be incorporated, wherein the radiotelephone includes a pivotable primary antenna in an operational position.
FIG. 2B is a side elevational view of the radiotelephone of FIG. 2A taken along lines 2B—2B.

Referring now to FIGS. 2A–2B and FIGS. 3A–3B, a radiotelephone 34 within which a paging antenna according to the present invention can be incorporated is illustrated. A primary antenna 30 is rotatably mounted to the housing 32 of the radiotelephone 34 via a hinge 36. The hinge 36 facilitates rotation of the primary antenna 30 about an axis A from a stored position (FIGS. 3A–3B) to an operating position (FIGS. 2A–2B). The illustrated hinge 36 is secured to an end 32a of the radiotelephone housing 32 so as to be unobstructed by other portions of the housing 32. It is understood that the present invention is not limited to radiotelephones having the illustrated hinge configuration. For example, the hinge 36 of the illustrated radiotelephone 34 may extend across the entire end 32a thereof.

In an operating position, the primary antenna 30 extends outwardly and away from the housing 32, as illustrated. In the stored position (FIGS. 3A–3B), the primary antenna 30 overlies the front surface 32a of the housing 32 adjacent the keypad 33, display 35, speaker slots 37 and microphone slot 38, as illustrated. When the primary antenna 30 is in the stored position, the radiotelephone may be referred to as being in "paging" mode.

The illustrated primary antenna 30 has a generally rectangular configuration and includes a free end 30a and an opposite end 30b pivotally mounted to the housing via hinge 36. The antenna 30 may be formed from a dielectric material and may include one or more conductive elements 31 disposed on a face 29 of the primary antenna 30, or disposed within the dielectric material, that serve as one or more radiating elements for transmitting and receiving radio frequency communications. A conductive element 31 of the primary antenna 30 may serve as a dipole or as a meandering antenna, as would be understood by those skilled in this art. When in the operational position (FIGS. 2A–2B), the primary antenna 30 may operate as a quarter-wave antenna, as is understood by those skilled in this art. The primary antenna conductive element 31 is electrically connected to a transceiver (not shown) within the radiotelephone housing 32, as would be known to those skilled in the art of radiotelephone communications, and need not be described further herein.

It is to be understood that the present invention is not limited to the illustrated radiotelephone or the illustrated pivotable primary antenna. Antennas incorporating paging antennas according to the present invention may have various shapes and sizes and may be pivotally attached to an electronic device, such as a radiotelephone, in various ways. In addition, paging antennas according to the present invention may be utilized with various types of electronic devices including, but not limited to, radiotelephones.

Figure 4:
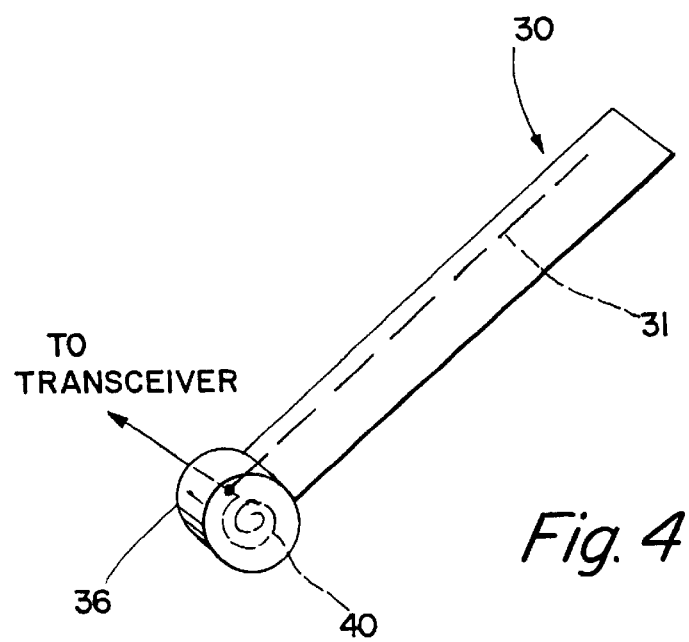
FIG. 4 illustrates a paging antenna, according to the present invention, incorporated into a portion of a hinge of a pivotable primary antenna.
Figure 5:
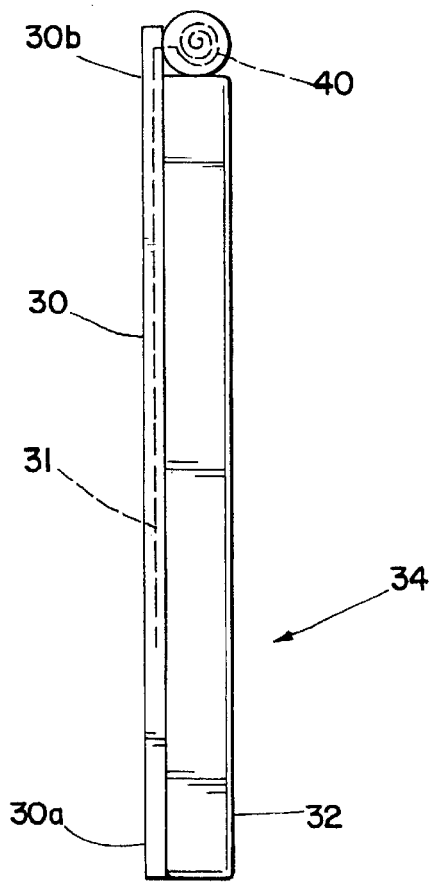
FIG. 5 illustrates a pivotable primary antenna for a radiotelephone in a stored position and a paging antenna according to the present invention incorporated within a portion of the primary antenna hinge.

Referring now to FIG. 4, a paging antenna 40 according to the present invention is disposed within a portion of a hinge 36 that rotatably connects a pivotable primary antenna 30 to a radiotelephone housing. The paging antenna 40 is preferably electrically connected with the conductive element 31 of the primary antenna 30. The radiation axis (i.e., signal vector) of the primary antenna 30 and the paging antenna 40 are orthogonal (i.e., form a right angle) with each other (FIG. 7C). Accordingly, when the primary antenna 30 is in a stored position, as illustrated in FIG. 5, the paging antenna 40 of the present invention is unobstructed by other portions of the radiotelephone 34. When the radiotelephone 34 is stored within a user's pocket, the paging antenna 40 is positioned advantageously to receive paging signals even though the primary antenna 30 is blocked by both the user's body and the radiotelephone housing 32.

Paging antennas according to the present invention may have various shapes and configurations and can be utilized within various types of hinges for pivotally connecting swivel antennas to electronic devices. Paging antennas according to the present invention can be encapsulated within the dielectric material of the hinge, or can be housed within a cavity of the hinge. Furthermore, paging antennas according to the present invention may be incorporated into any type of protuberance that extends outwardly from a radiotelephone housing so as to be unobstructed by the housing.

Figure 6:
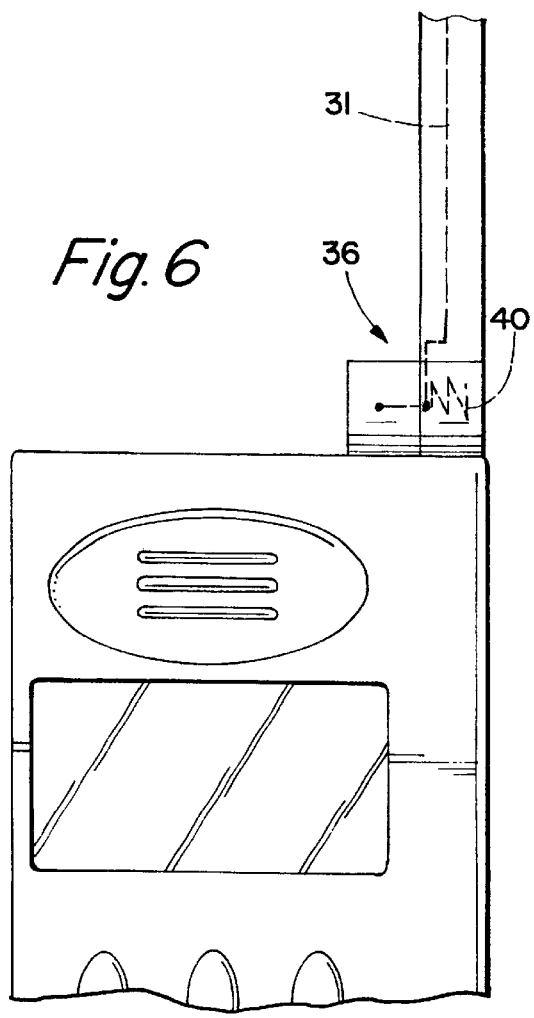
FIG. 6 illustrates a paging antenna according to the present invention having a conical configuration.

Particularly preferable are conical and helical paging antenna configurations. A paging antenna according to the present invention with a conical or helical configuration can be easily disposed within small cavities and housing portions, such as hinges. FIG. 6 illustrates a paging antenna 40 according to the present invention having a conical configuration. It is understood that the shape and configuration of a paging antenna according to the present invention may be a tuning parameter and may vary according to the configuration and tuning performance of a primary antenna.

Figure 7A:
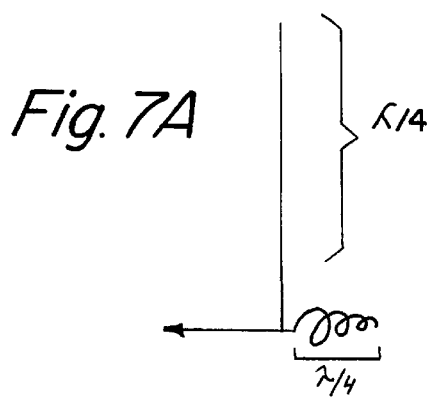
FIG. 7A illustrates an electrical equivalent circuit for a quarter-wave paging antenna having a radiation axis orthogonal with a radiation axis of a quarter-wave primary antenna, according to the present invention.
Figure 7B:
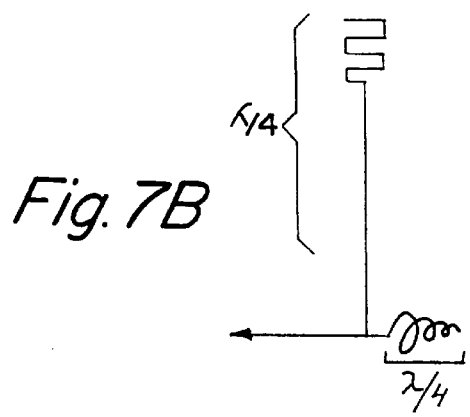
FIG. 7B illustrates an electrical equivalent circuit for a quarter-wave paging antenna having a radiation axis orthogonal with a quarter-wave meandering primary antenna, according to the present invention.

Referring now to FIGS. 7A and 7B, an exemplary electrical equivalent circuit for a primary antenna combined with a paging antenna according to the present invention is illustrated. Paging antennas according to the present invention preferably operate as a quarter-wave antenna. When a paging antenna is placed orthogonally with a quarter-wave dipole or meandering primary antenna, the combined antenna can have higher antenna gain than either the primary or paging antenna individually, both when the primary antenna is in an operating position and a stored position. FIG. 7A illustrates an electrical equivalent circuit for a quarter-wave paging antenna connected orthogonally with a quarter-wave dipole primary antenna, according to the present invention. FIG. 7B illustrates an electrical equivalent circuit for a quarter-wave paging antenna connected orthogonally with a quarter-wave meandering primary antenna, according to the present invention.

As illustrated in FIG. 7C, the radiation axis or signal vector 47 the primary antenna 30 is orthogonal to the signal vector 48 of the paging antenna 40. The vector sum of the primary and paging antenna signal vectors 47, 48 is the input signal 49 to the transceiver. As illustrated, the input signal 49 is greater than either of the signal vectors 47, 48. Accordingly, the received signal by a radiotelephone incorporating the present invention is higher than either the primary or paging antenna signal.

According to another embodiment of the present invention, impedance matching circuitry 45 can be disposed within a portion of the hinge 36 that rotatably connects the primary antenna 30 to the radiotelephone housing 32 (FIG. 8). By placing impedance matching circuitry 45 close to the primary antenna 30, any reflection caused by impedance mismatch by connector or wire can be reduced.

Figures 9A, 9B:
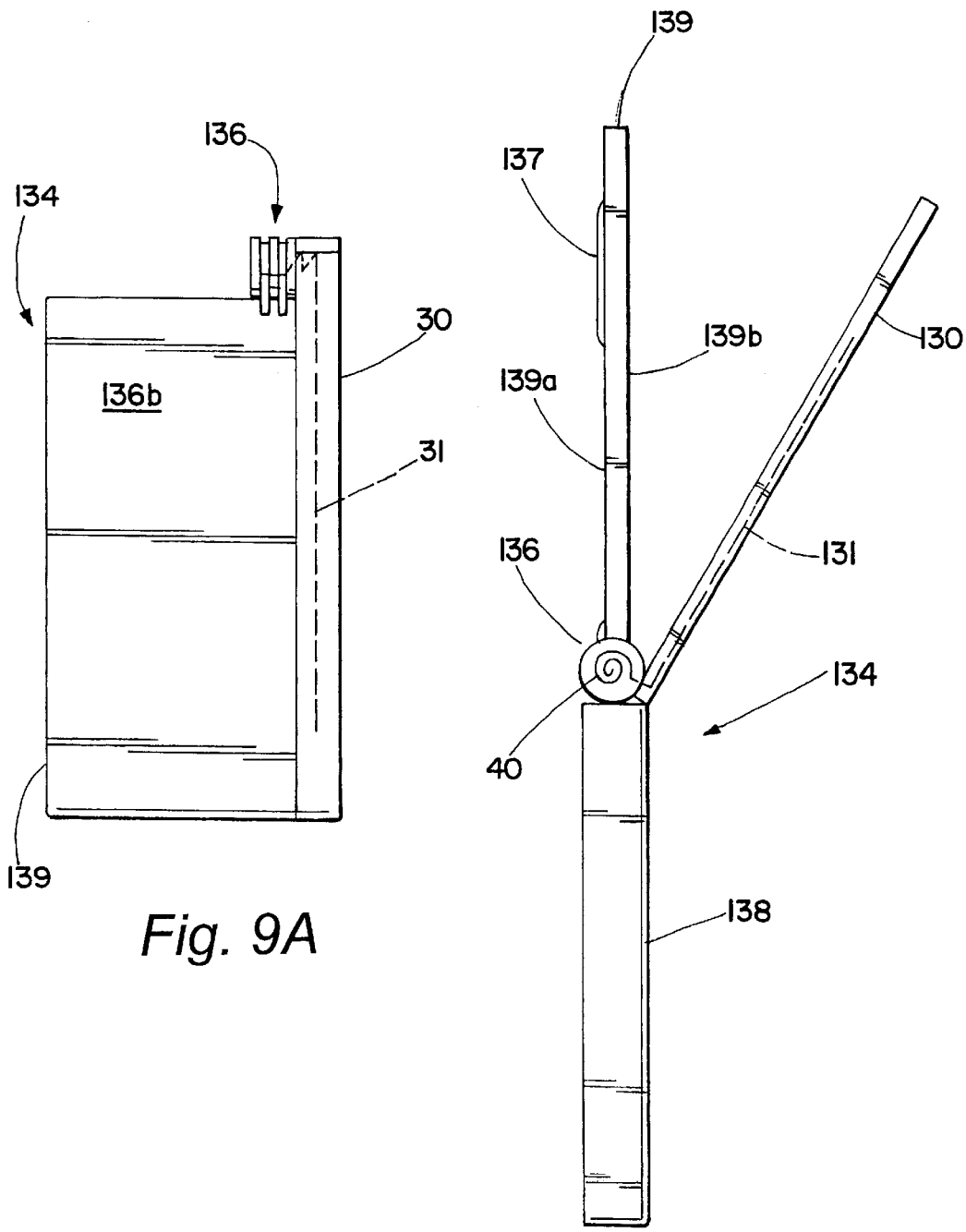
FIG. 9A illustrates a "flip-style" radiotelephone having a flip cover and a separate pivotable primary antenna with a paging antenna according to the present invention incorporated within the primary antenna hinge, and wherein the flip cover and primary antenna are in stored positions.
FIG. 9B illustrates the radiotelephone of FIG. 9A with the flip cover and primary antenna in respective operational positions.

Referring now to FIGS. 9A–9B, a "flip-style" radiotelephone 134 incorporating a paging antenna 40 according to the present invention is illustrated. The illustrated radiotelephone 134 includes a flip cover 139 that houses a speaker 137, and a bottom handset portion 138 pivotally connected thereto via hinge 136. The flip cover 139 includes opposite front and back surfaces 139a, 139b and is hinged to one end of the bottom handset portion 138, as illustrated.

In operation, the flip cover 139 and primary antenna 30 may be pivoted by a user between stored (FIG. 9A) and open (FIG. 9B) positions. When in a stored position, the flip cover 139 overlies the bottom handset housing 138. The primary antenna 130, when in a stored position, pivots down upon the flip portion back surface 139b. Accordingly, the paging antenna 40 can remain unobstructed even when the primary antenna 130 and flip cover 139 are in stored positions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An antenna system for an electronic device, wherein the electronic device includes a housing having an end portion, and wherein the housing is configured to enclose a receiver that receives wireless communication signals, the antenna system comprising:

a hinge rotatably fixed to the housing end portion;

a primary antenna secured to the hinge and rotatable therewith along a predetermined path of rotation from a stored position adjacent the housing to an operating position extending away from the housing, wherein the primary antenna is in electrical communication with the receiver, and wherein the primary antenna comprises a first radiation axis; and a paging antenna disposed within the hinge, wherein the paging antenna is electrically connected with the primary antenna, wherein the paging antenna comprises a second radiation axis that is orthogonal to the first radiation axis throughout the predetermined path of rotation of the primary antenna, and wherein the paging antenna is configured to receive paging signals when the primary antenna is in the stored position.

2. An antenna system according to claim 1 wherein the paging antenna has a coiled configuration.

3. An antenna system according to claim 1, wherein the primary and paging antenna operate independently as respective quarter-wave antennas in the operating and stored positions.

4. An antenna system according to claim 1 wherein an impedance of the primary antenna and paging antenna, in combination, matches an impedance of the receiver when the primary antenna is in both the stored and operating positions.

5. An antenna system according to claim 1 wherein the primary antenna comprises:

a dielectric substrate having a face; and a radiating element disposed on the dielectric substrate face.

6. An antenna system according to claim 5 wherein the radiating element is disposed within the dielectric substrate.

7. A radiotelephone, comprising:

a housing having an end portion, wherein the housing is configured to enclose a transceiver that transmits and receives radiotelephone communication signals;

a hinge rotatably fixed to the housing end portion; and an antenna system comprising:

a primary antenna secured to the hinge and rotatable therewith along a predetermined path of rotation from a stored position adjacent the housing to an operating position extending away from the housing, wherein the primary antenna is in electrical communication with the transceiver, and wherein the primary antenna comprises a first radiation axis; and a paging antenna disposed within the hinge, wherein the paging antenna is electrically connected with the primary antenna, wherein the paging antenna comprises a second radiation axis that is orthogonal to the first radiation axis throughout the predetermined path of rotation of the primary antenna, and wherein the paging antenna is configured to receive paging signals when the primary antenna is in the stored position.

8. A radiotelephone according to claim 7 wherein the primary and paging antenna operate independently as quarter-wave antennas in the operating and stored positions.

9. A radiotelephone according to claim 7 wherein an impedance of the primary antenna and paging antenna, in combination, matches an impedance of the receiver when the primary antenna is in both the stored and operating positions.

10. A radiotelephone according to claim 7 wherein the primary antenna comprises:

a dielectric substrate having a face; and a radiating element disposed on the dielectric substrate face.

11. A radiotelephone according to claim 10 wherein the radiating element is disposed within the dielectric substrate.

* * * * *